(12) United States Patent
Öztürk

(10) Patent No.: US 8,047,090 B2
(45) Date of Patent: Nov. 1, 2011

(54) METHOD OF GENERATING ROTATION ABOUT AN OUTPUT AXIS AND MOTOR FOR GENERATING ROTATION ABOUT AN OUTPUT AXIS

(75) Inventor: Mustafa Naci Öztürk, Istanbul (TR)

(73) Assignee: Erke Erke Arastirmalari Ve Muhendislik A.S., Istanbul (TR)

( * ) Notice: Subject to any disclaimer, the term of this patent is extended or adjusted under 35 U.S.C. 154(b) by 295 days.

(21) Appl. No.: 12/311,600

(22) PCT Filed: Nov. 13, 2006

(86) PCT No.: PCT/IB2006/054206
§ 371 (c)(1), (2), (4) Date: Apr. 2, 2009

(87) PCT Pub. No.: WO2008/044097
PCT Pub. Date: Apr. 17, 2008

(65) Prior Publication Data
US 2009/0288505 A1    Nov. 26, 2009

(30) Foreign Application Priority Data
Oct. 10, 2006  (TR) .............................. A 2006 05622

(51) Int. Cl.
*G01C 19/30* (2006.01)
(52) U.S. Cl. .......................................... 74/5.47
(58) Field of Classification Search ............. 74/5.42, 74/5.47
See application file for complete search history.

(56) References Cited

U.S. PATENT DOCUMENTS

| | | | |
|---|---|---|---|
| 4,838,099 A * | 6/1989 | Quermann | 74/5.47 |
| 6,789,437 B2 * | 9/2004 | Wyse | 74/5.4 |
| 2002/0145077 A1 | 10/2002 | Shultz | |
| 2003/0234318 A1 | 12/2003 | Neff | |

FOREIGN PATENT DOCUMENTS

| | | |
|---|---|---|
| DE | 19654528 A1 | 7/1998 |
| EP | 1452830 A1 | 9/2004 |
| FR | 2511089 A1 | 2/1983 |
| FR | 2876163 A1 | 4/2006 |

OTHER PUBLICATIONS

International Search Report, PCT/IB2006/054206, dated Jul. 27, 2007.
Vulkov, JBIS; 65; 394-397 (2002).

* cited by examiner

*Primary Examiner* — Edwin A Young
(74) *Attorney, Agent, or Firm* — Lerner, David, Littenberg, Krumholz & Mentlik, LLP

(57) ABSTRACT

The present invention relates to motors and, more specifically to rotary motors which can supply output motive power about an output axis in response to input rotary power about a different axis. A motor (1) comprises a wheel (2) mounted on a shaft (3) for rotation about a first axis (4). The shaft (3) is additionally mounted for rotation about both an inclination axis (16) and the output axis (11) of the motor (1).

48 Claims, 3 Drawing Sheets

METHOD OF GENERATING ROTATION ABOUT AN OUTPUT AXIS AND MOTOR FOR GENERATING ROTATION ABOUT AN OUTPUT AXIS

CROSS REFERENCE TO RELATED APPLICATIONS

The present application is a national phase entry under 35 U.S.C. §371 of International Application No. PCT/IB2006/054206, filed Nov. 13, 2006, published in English, which claims the benefit of Turkish Patent Application No. 2006/05622, filed Oct. 10, 2006. The disclosures of said applications are incorporated by reference herein.

The present invention relates to motors and, more specifically to rotary motors which can supply output motive power about an output axis in response to input rotary power about a different axis.

When a rotating body is acted on by a torque about an axis perpendicular to the axis of rotation, this causes the axis of rotation itself to rotate about a further axis which is perpendicular to both the axis of the applied torque and the axis of rotation. This principle is well known.

The inventors of the present invention have found that, when the axis of rotation of the body (referred to below as the first axis) is itself constrained to rotate about (a) a second axis (referred to below as the output axis) which is at an acute angle to the axis of rotation of the body and (b) a third axis (referred to below as the inclination axis) which is substantially perpendicular to both the first and second axes, the application of a torque about the inclination axis in the direction so as to increase the acute angle causes the first axis to rotate about the output axis. When the speed of rotation of the body exceeds a certain critical value, this applied torque gives rise to a reaction torque of a magnitude greater than that of the applied torque and which is also directed about the inclination axis, but in the opposite direction. This reaction torque causes the first axis to rotate about the inclination axis in the direction so as to decrease the inclination angle. However, if this rotation about the inclination axis is limited, e.g. by mechanical means, then the speed of rotation of the body about the output axis is increased, thus giving rise to a useful source of motive power. It will be appreciated that, with such a system, the means which are used to limit this rotation do not require a source of energy, thus enhances the efficiency of the motor.

In order to understand these effects, it is useful to consider the position when the body is caused to rotate at different speeds. In the trivial situation in which the body does not rotate at all about the first axis, the application of a torque about the inclination axis in the direction so as to increase the magnitude of the acute angle gives rise merely to a corresponding rotation of the first axis about the inclination axis in the direction so as to increase the inclination angle. If the body is caused to rotate at a rotational speed which is less than the critical value, there are two resulting rotations of the first axis: not only is there a rotation of the first axis about the inclination axis in the direction so as to increase the inclination angle, as with the case of a stationary body, but there is also a rotation of the first axis about the output axis. As the rotational speed of the body increases, the speed of rotation of the first axis about the inclination axis decreases, whereas the speed of rotation of the first axis about the output axis increases. When the rotational speed of the body reaches the critical value, there is still the rotation of the first axis about the output axis, but there is now no longer any rotation of the first axis about the inclination axis. At rotational speeds above the critical speed, there are again two rotations of the first axis, i.e. about both the output axis and the inclination axis, but in this case the rotation about the inclination axis is in the direction so as to decrease the inclination angle. It is only when the rotational speed of the body is above the critical speed that the motor is able to generate useful motive power.

Since there is a delay between the time at which the torque is applied and the time at which this gives rise to a desired speed of rotation of the first axis about the output axis of the motor due to the inertia of the body, it is advantageous in some circumstances to reduce this delay by providing an additional, external torque to the body about the output axis of the motor, so as to initiate or accelerate this rotation. This could be achieved, for example, by physically rotating the output shaft of the motor, either manually or by means of an additional motor.

The critical value of the rotational speed of the body has been found to vary in dependence on the size of the body, the density of the material of the body, the inclination angle, the magnitude of the torque and certain environmental conditions such as ambient temperature and humidity.

The present inventors have found experimentally that the input motive power supplied to the body to cause it to rotate is used to generate output motive power in the form of the rotation of the body about this output axis with extremely high efficiency, and that a motor built according to this principle would therefore be of particular utility.

Thus, in accordance with a first aspect of the present invention there is provided a motor for generating rotation about an output axis, the motor comprising: a body mounted for rotation about first, second and third axes, the first axis being oriented with respect to the second axis at an inclination angle, the second axis constituting the output axis of the motor, wherein rotation of the body about the third axis gives rise to a change in the inclination angle; the motor being so structured as to enable a source of motive power to be connected to the body to cause it to rotate about the first axis at a rotational speed in excess of a predetermined value; means for applying a torque to the body about the third axis in the direction of increasing inclination angle when the first axis is at a selected inclination angle with respect to the second axis which is greater than 0 degrees and less than 90 degrees, thereby to generate a counter-torque about the third axis in the sense of decreasing inclination angle; and means for limiting rotation of the body about the third axis in the direction of decreasing inclination angle which would otherwise occur as a result of the counter-torque, such that the inclination angle of the first axis with respect to the second axis remains greater than 0 degrees and less than 90 degrees, thereby to initiate, or to increase the speed of, rotation of the body about the second axis so as to generate motive power.

The present inventors have found that, with such an arrangement, the efficiency of the motor is extremely high. Furthermore, the torque applying means conveniently acts as a switch which enables the output motive power to be generated.

As mentioned above, since the rotation limiting means does not move, it can be constituted by a purely mechanical means which does not require a source of energy, thereby contributing to the high efficiency of the motor.

The limiting means is arranged to prevent any rotation of the body about the third axis in the direction of decreasing inclination angle.

A source of motive power may be connected to the body so as to cause it to rotate about the first axis at a rotational speed in excess of the predetermined value. Alternatively, the rotation could be generated manually.

The motor preferably comprises feedback means for transmitting motive power from the motion of the body about the second axis to the source of motive power. In this way, it is possible to feed back at least a portion of the output power into the motor. The feedback means is preferably arranged to transmit sufficient motive power to the source of motive power to overcome the energy losses arising from friction due to the rotation of the body about the first axis at a steady operating state.

Means are preferably provided for controlling the source of motive power so as to cause the body to rotate about the first axis at said rotational speed in excess of the predetermined value.

It has been found that there is an optimum inclination angle which depends on various factors including the torque required of the motor and the speed of rotation of the motor. Thus, when the inclination angle is close to 0 degrees, the output torque of the motor is at a minimum but the rotational speed of the motor is at a maximum. Conversely, when the inclination angle is close to 90 degrees, the output torque is at a maximum, but the rotational speed is at a minimum. Since the output power of the motor is the product of the output torque and the output rotational speed, it follows that, in order to maximise the output power, it will be necessary to select an inclination angle for which the product of the output torque and the output rotational speed is maximised.

Thus, the motor preferably further comprises means for adjusting the inclination angle. In this case, means may be provided for selecting a desired output speed and/or desired output torque of the motor and adjusting the inclination angle accordingly.

It is preferred that the torque applying means is arranged to apply the torque when the selected inclination angle is within the range of 10 degrees to 80 degrees.

It is also preferred that the limiting means be arranged so as to limit rotation of the body about the third axis such that the inclination angle of the first axis with respect to the second axis is greater than 10 degrees and less than 80 degrees.

The means for applying a torque may comprise a spring or, alternatively one or more of: a hydraulic ram; a pneumatic ram; and an electromagnetic ram.

The means for applying a torque may serve, additionally, as the limiting means. Alternatively, the limiting means may comprise a separate abutment.

Means are preferably provided for controlling the magnitude of the torque applied by the torque applying means.

In a first embodiment the first and second axes intersect, and either or both of the first and second axes preferably pass through, substantially the centre of mass of the body.

In a second, alternative embodiment, the first and second axes do not intersect, in which case the inclination angle is defined as the acute angle between the first and second axes when viewed along the direction of the shortest line joining the first and second axes. An alternative way of expressing this geometric relationship is to consider a point on the first axis and to consider an imaginary line which passes through this point and which is parallel to the second axis. The inclination angle is then defined as the acute angle at which the first axis intersects this imaginary line.

The body is preferably cylindrically symmetrical about the first axis and may comprise a cylinder the thickness of which is tapered from a maximum value proximal to the first axis to a minimum value at its circumference.

The body is preferably made from a material having a high modulus of elasticity, which is preferably above 100 GPa.

The material of the body is selected such that its density is appropriate to the output motive power required of the motor.

Thus, if a high output motive power is required, a material with high density, such as steel, may be used. However, it can be difficult, and hence expensive, to form steel into a desired shape, and so, for low output power requirements, thermoplastic materials may alternatively be used.

With such a motor, it is possible that undesirable vibrations could arise from unbalanced forces within the motor, as a result of (a) the lack of symmetry of the components of the motor about the output axis and (b) the component of the reaction torque which is directed perpendicular to the output axis. This problem could be solved by rigidly mounting the motor to the ground. Alternatively, or in addition, one or more counterbalance masses could be mounted for rotation about the output axis to as to compensate at least partially for this, by reducing the lack of symmetry and by giving rise to a centripetal force which balances the reaction torque. A further option, which could be used either on its own or in conjunction with one or both of the above solutions, would be to provide a plurality of such motors may be mounted together and caused to operate at substantially the same frequency but at different respective phases. In this case, any such vibrations are minimised if the phases of the motors are equally spaced. Thus, for a system of four motors, the phases would be 0 degrees, 90 degrees, 180 degrees and 270 degrees.

The present invention thus extends to an assembly of motors of the above type, in combination with means for causing each of the motors to rotate at substantially the same rotational frequency but at different respective phase angles and means for combining the output motive power of the motors.

In such as case, the preferred number of motors is four, and the motors can advantageously be arranged in a 2×2 array.

The invention extends to a vehicle powered by a motor as defined above, such as a road vehicle, an aircraft or a waterborne vehicle.

The invention further extends to an electricity generator comprising a motor as defined above.

In accordance with a second aspect of the present invention there is provided a method of generating rotation about an output axis, the method comprising: mounting a body for rotation about first, second and third axes, the first axis being oriented with respect to the second axis at an inclination angle, the second axis constituting the output axis of the motor, wherein rotation of the body about the third axis gives rise to a change in the inclination angle; rotating the body about the first axis at a rotational speed in excess of a predetermined value; applying a torque to the body about the third axis in the direction of increasing inclination angle when the first axis is at a selected inclination angle with respect to the second axis which is greater than 0 degrees and less than 90 degrees, thereby to generate a counter-torque about the third axis in the direction of decreasing inclination angle; and limiting rotation of the body about the third axis in the direction of decreasing inclination angle which would otherwise occur as a result of the counter-torque, such that the inclination angle of the first axis with respect to the second axis remains greater than 0 degrees and less then 90 degrees; thereby to initiate, or to increase the speed of, rotation of the body about the second axis so as to generate motive power.

The method preferably further comprises adjusting the inclination angle in dependence on the desired speed of rotation of the output axis of the motor. In this case, the desired output speed and/or desired output torque of the motor may be selected and the inclination angle adjusted accordingly.

The method preferably further comprises using some of the generated motive power perform the step of rotating the body about the first axis. In this case, the amount power so used is preferably sufficient to overcome the energy losses arising from friction due to the rotation of the body about the first axis.

The present invention extends to a method of manufacturing a vehicle powered by a method as defined above. The vehicle may be in the form of a road vehicle, and aircraft or a water-borne vehicle.

The invention extends to a method of obtaining a supply of pure water from the atmosphere by cooling a surface which is exposed to the atmosphere using a condenser pump powered by a method as defined above.

The invention further extends to a method of removing pollution from the atmosphere by causing air from the atmosphere to be pumped through a filter using a pump which is powered by a method as defined above.

The invention further extends to a method of generating electricity using a method as defined above. This could be achieved by coupling the output rotation of the motor to a dynamo.

A preferred, non-limiting embodiment of the present invention will now be described with reference to the accompanying drawings, in which.

Figure 1:
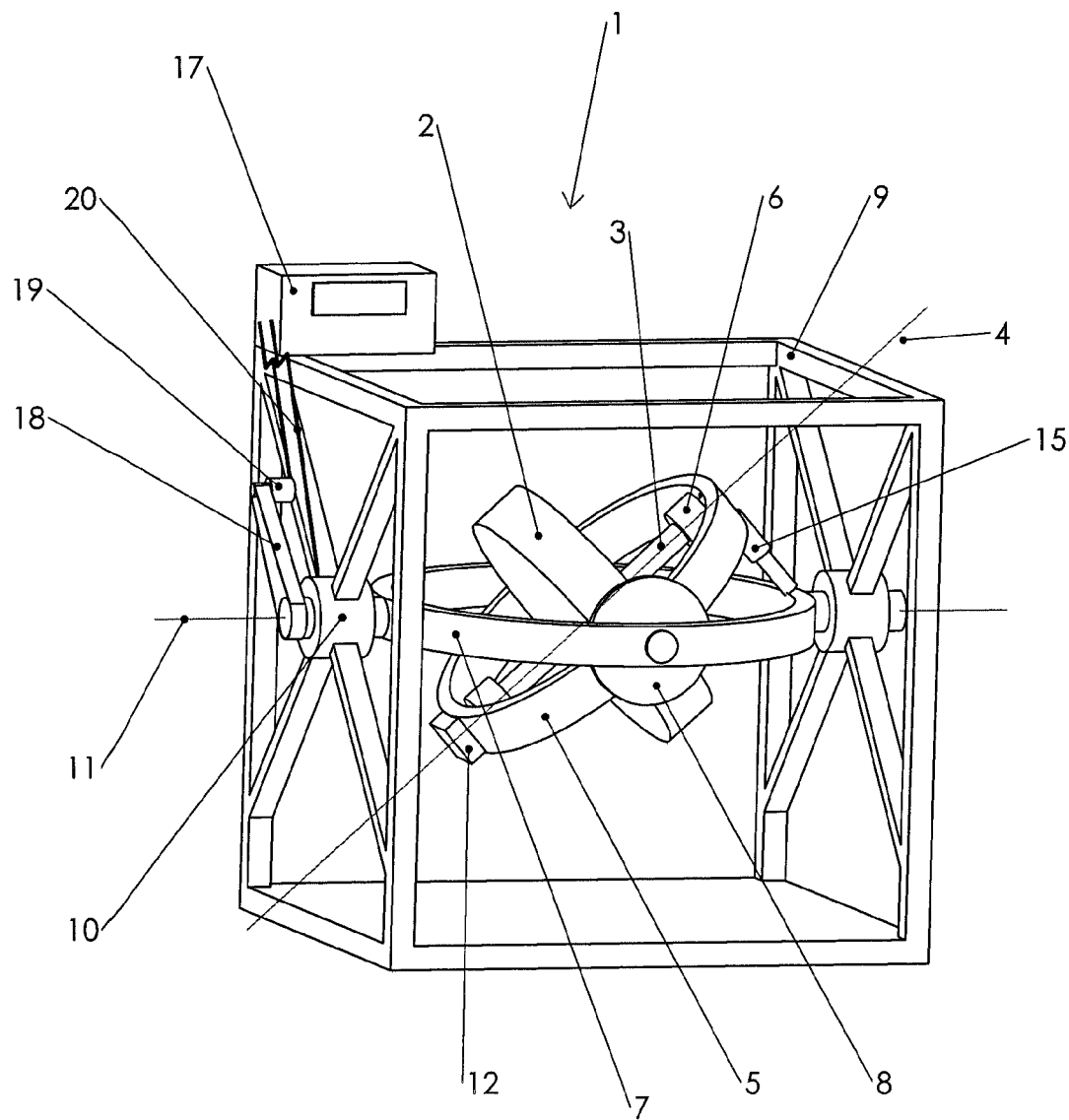
FIG. 1 illustrates is a schematic view of a motor in accordance with the preferred embodiment of the present invention.

Referring to FIG. 1, a motor 1 comprises a body in the form of a solid cylindrical wheel 2 which is mounted coaxially on a rotation shaft 3 for rotation therewith about a first axis 4. The rotation shaft 3 is mounted within an inner cradle 5 by means of inner bearings 6. The inner cradle 5 is mounted within an outer cradle 7 for limited rotation about an axis, referred to below as the inclination axis, by means of outer bearings 8, and the second cradle 7, in turn, is mounted within a frame 9 via frame bearings 10 such that it can rotate relative to the frame 9 about a second axis 11 constituting the output axis of the motor 1.

Figure 2:
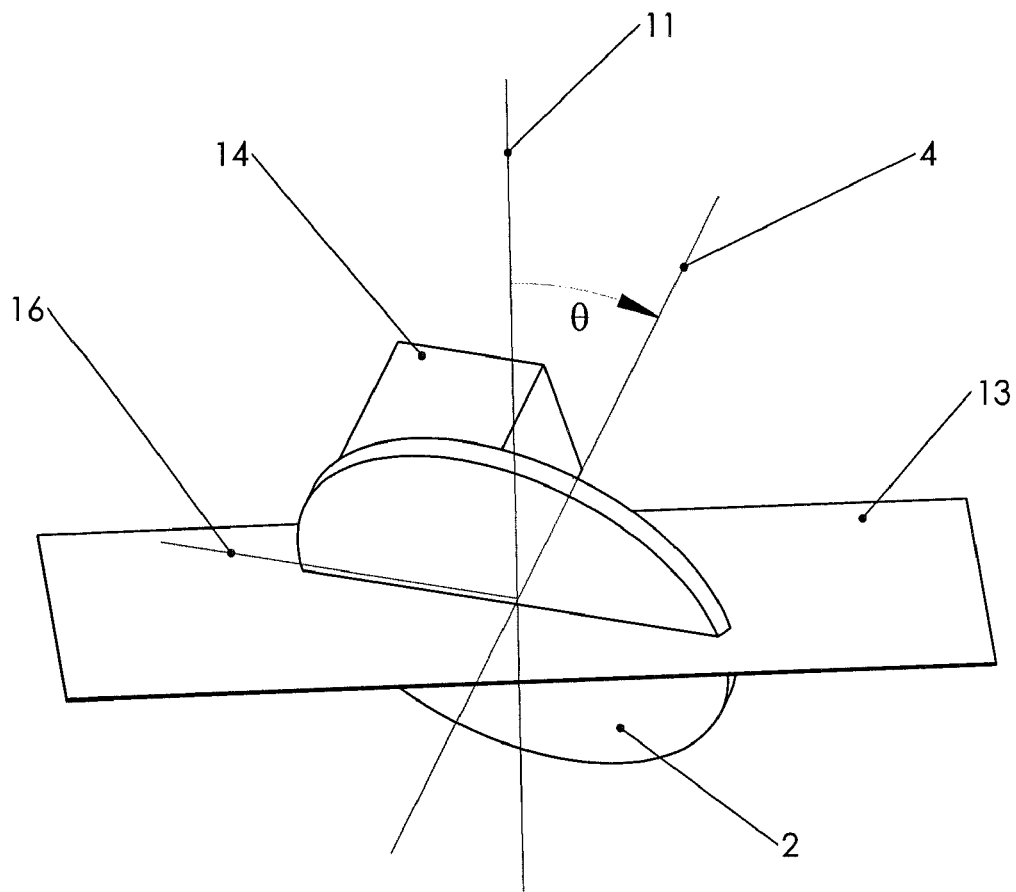
FIG. 2 is a diagram illustrating the relative orientation of the axes of rotation of components of the motor of FIG. 1.

The rotation shaft 3 of the wheel 2 is caused to rotate about the first axis 4 by means of an electric motor 12 or other source of input motive power. The electric motor 12 may be powered by a battery. The rotation shaft 3 is mounted at an inclination angle θ relative to the output axis 11 of the motor 1 which is greater than 0 degrees and less than 90 degrees. This can be seen more clearly in FIG. 2. The wheel 2 is mounted such that the first axis 4 and the second axis 11 intersect at the centre of mass of the wheel 2. A plane 13 is indicated in FIG. 2 to illustrate more clearly the location of the wheel 2 in space, and a cube 14 is shown purely to illustrate the relative orientation of the axes.

A hydraulic ram 15 serves to apply a torque to the rotation shaft 3 and thereby also to the wheel 2 about a third axis 16, defined as the inclination axis, which is perpendicular both to the first axis 4 and the second axis 11 and directed in the direction of increasing inclination angle θ.

This gives rise to a rotation of the first axis 4 about the second, output axis 11 of the motor 1.

The hydraulic ram 15 serves additionally to prevent the inclination angle θ of the first axis 4 from rotating in the sense opposite to that of the applied torque.

In operation of the motor 1, the wheel 2 is first caused to rotate about the first axis 4 until it exceeds a predetermined critical rotational speed. The hydraulic ram 15 is then actuated so as to apply a torque to the wheel 2 indirectly via the inner bearings 6 and the rotation shaft 3 about the inclination axis 16 and in the sense of increasing inclination angle θ. This gives rise to a rotation of the first axis 4 about the output axis 11. However, by virtue of the rotation of the wheel 2 above the critical rotational speed about the first axis 4, a reaction torque is generated which has a component also about the inclination axis 16 but in the opposite sense, i.e. of decreasing inclination angle θ. This reaction torque causes the first axis 4 to rotate additionally about the inclination axis 16 in the sense so as to reduce the inclination angle θ. However, this movement is subsequently prevented by the hydraulic ram 15, which acts as an abutment. As a result, the rotational speed of the wheel 2, the rotation shaft 3, the first cradle 5 and the second cradle 7 about the output axis 11 is increased. At this stage, a load may be applied to the output of the motor 1.

Operation of the hydraulic ram 15 is controlled by a control unit 17 which is supplied with position signals from a sensor (not shown) which is mounted on the hydraulic ram 15. Control signals generated by the control unit 17 in response to the position signals affect the hydraulic pressure in the hydraulic ram 15 so as to cause the inner cradle 5 to rotate relative to the outer cradle 7 to the desired inclination angle θ.

The control unit 17 provides control signals for controlling the speed of rotation of the wheel 2, the inclination angle θ and the magnitude of the applied torque. As indicated above, the inclination angle θ is controlled by virtue of the hydraulic ram 15. By controlling these parameters, it is possible to control the output rotation speed of the motor 1.

A feedback mechanism in the form of a belt 18, an alternator 19, an electrical harness 20 and the control unit 17 serves to supply a portion of the output motive power from the motor 1 back to the electric motor 12.

Figure 3:
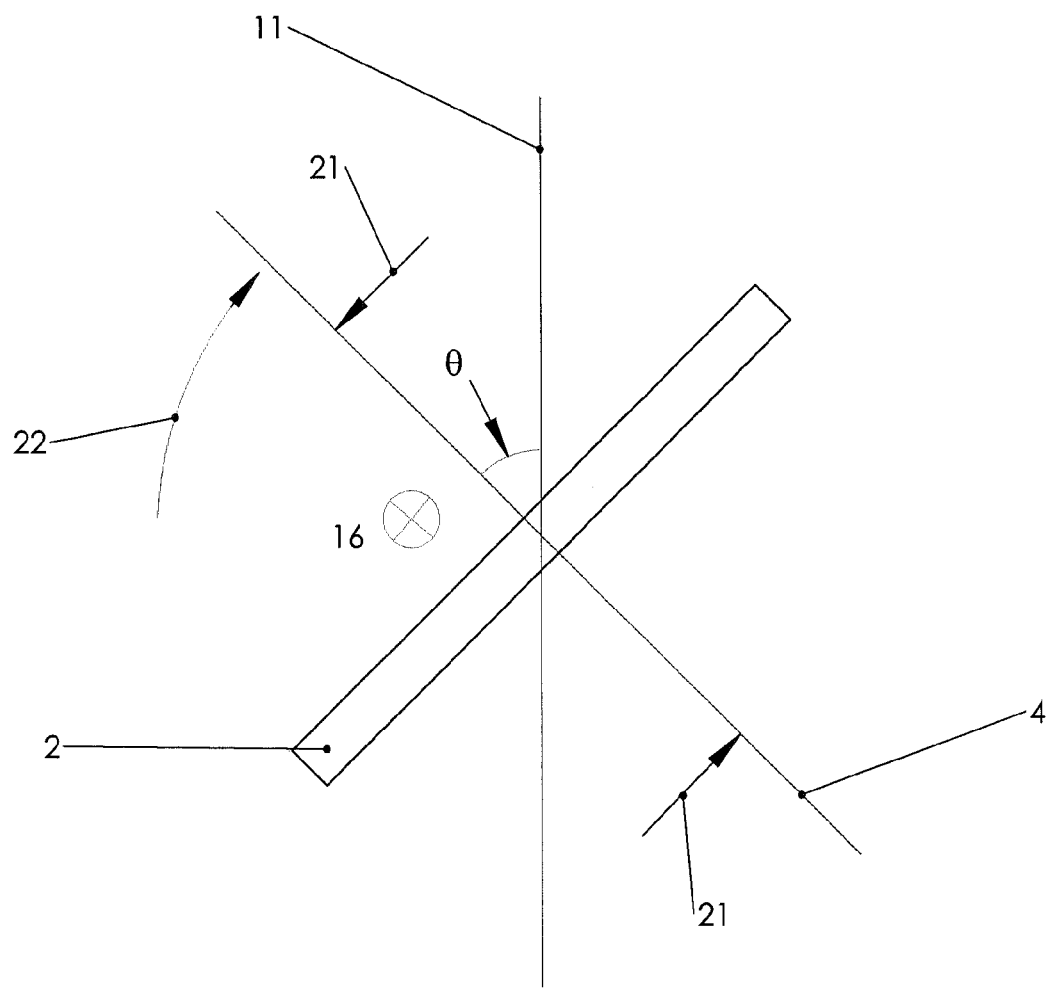
FIG. 3 is a diagram illustrating the direction in which torque is applied to generate the output motive power of the motor of FIG. 1.

The orientation of the inclination axis about which the torque is applied and the sense of the torque are illustrated in FIG. 3, in which it can be seen that the wheel 2 rotates about the first axis 4 which is at an inclination angle θ with respect to the second, output axis 11. The torque applied by the hydraulic ram 15 is applied in the direction indicated by the arrows numbered 21, and the resulting reaction torque arises in the direction indicated by the arrow numbered 22.

Although in the preferred embodiment the first axis 4 and the second axis 11 intersect at the centre of mass of the wheel 2, alternative arrangements are envisaged in which the first and second axes do not intersect, in which case either, or indeed neither, of the first and second axes may pass through the centre of mass of the wheel.

It will be appreciated that, although the motor of the preferred embodiment is illustrated with its output axis horizontal, the motor would function with its output axis in any desired orientation.

The invention claimed is:

1. A method of generating rotation about an output axis (11), the method comprising:
   A) mounting a body (2) for rotation about first (4), second (11) and third (16) axes, the first axis (4) being oriented with respect to the second axis (11) at an inclination angle (θ), the second axis (11) constituting an output axis (11) of a motor (1), wherein rotating the body (2) about the third axis (16) gives rise to a change in the inclination angle (θ);
   B) rotation the body (2) about the first axis (4) at a rotational speed in excess of a predetermined value;
   C) applying a torque to the body (2) about the third axis (16) in a direction to increase inclination angle (θ) when the first axis (4) is at a selected inclination angle (θ) with respect to the second axis (11) which is greater than 0 degrees and less than 90 degrees, thereby to generate a counter-torque about the third axis in a direction to decrease inclination angle (θ);

D) limiting rotation of the body (2) about the third axis (16) in a direction to decrease inclination angle (θ) which would otherwise occur as a result of the counter-torque, such that the inclination angle (θ) of the first axis (4) with respect to the second axis (11) remains greater than 0 degrees and less than 90 degrees; thereby to initiate, or to increase the speed of, rotation of the body (2) about the second axis (11) so as to generate motive power.

2. A method as claimed in claim 1 further comprising providing an additional, external torque to the body (2) about the output axis (11) of the motor (1) to prevent a time delay.

3. A method as claimed in claim 1, further comprising controlling the source of motive power (12) so as to cause the body (2) to rotate about the first axis (4) at said rotational speed in excess of the predetermined value.

4. A method as claimed in claim 1, wherein the selected inclination angle (θ) is greater than 10 degrees and less than 80 degrees.

5. A method as claimed in claim 1, further comprising controlling the magnitude of the torque applied.

6. A method as claimed in claim 1, wherein the rotation of the body (2) about the third axis (16) is so limited such that the inclination angle (θ) of the first axis (4) with respect to the second axis (11) is greater than 10 degrees and less than 80 degrees.

7. A method as claimed in claim 1, further comprising adjusting the inclination angle (θ).

8. A method as claimed in claim 7, further comprising the step of selecting a desired output speed of the motor (1) and adjusting the inclination angle (θ) in dependence on the selected output speed.

9. A method as claimed in claim 1, further comprising the step of selecting a desired output torque of the motor (1) and adjusting the inclination angle (θ) in dependence on the selected output torque.

10. A method as claimed in claim 1, wherein the step of limiting comprises preventing any rotation of the body (2) about the third axis (16) in a direction to decrease inclination angle (θ).

11. A method as claimed in claim 1, further comprising using some of the generated motive power to perform the step of rotating the body (2) about the first axis (4) at a stable operating state.

12. A method as claimed in claim 11, wherein the amount of motive power so used is sufficient to overcome the energy losses arising from friction due to the rotation of the body (2) about the first axis (4).

13. A method of manufacturing a vehicle powered by a method as claimed in claim 1.

14. A method as claimed in claim 13, wherein the vehicle is in the form of a road vehicle.

15. A method as claimed in claim 13, wherein the vehicle comprises an aircraft.

16. A method as claimed in claim 13, wherein the vehicle comprises a waterborne vehicle.

17. A method of obtaining a supply of pure water from the atmosphere by cooling a surface which is exposed to the atmosphere using a condenser pump powered by a method as claimed in claim 1.

18. A method of removing pollution from the atmosphere by causing air from the atmosphere to be pumped through a filter using a pump which is powered by a method as claimed in claim 1.

19. A motor for generating rotation about an output axis (11), the motor (1) comprising:

a) a body (2) mounted for rotation about first (4), second (11) and third (16) axes, the first axis (4) being oriented with respect to the second axis (11) at an inclination angle (θ), the second axis (11) constituting the output axis (11) of the motor (1), wherein rotation of the body (2) about the third axis (16) gives rise to a change in the inclination angle (θ);

b) the motor (1) being so structured as to enable a source of motive power (12) to be connected to the body (2) to cause it to rotate about the first axis (4) at a rotational speed in excess of a predetermined value;

c) means (15) for applying a torque to the body (2) about the third axis (16) in a direction to increase inclination angle (θ) when the first axis (4) is at a selected inclination angle (θ) with respect to the second axis (11) which is greater than 0 degrees and less than 90 degrees, thereby to generate a counter-torque about the third axis in a direction to decrease inclination angle (θ);

d) means (15) for limiting rotation of the body (2) about the third axis (16) in a direction to decrease inclination angle (θ) which would otherwise occur as a result of the counter-torque, such that the inclination angle (θ) of the first axis (4) with respect to the second axis (11) remains greater than 0 degrees and less than 90 degrees; thereby to initiate, or to increase the speed of, rotation of the body (2) about the second axis (11) so as to generate motive power.

20. A motor (1) as claimed in claim 19, further comprising the source of motive power (12) which is connected to the body (2) so as to cause it to rotate about the first axis (4) at a rotational speed in excess of the predetermined value.

21. A motor (1) as claimed in claim 20, further comprising feedback means (17, 18, 19, 20) for transmitting motive power from the motion of the body (2) about the second axis (11) to the source of motive power.

22. A motor (1) as claimed in claim 21, wherein the feedback means (17, 18, 19, 20) is arranged to transmit sufficient motive power to the source of motive power (12) to overcome the energy losses arising from friction due to the rotation of the body (2) about the first axis (4) at a stable operating state.

23. A motor (1) as claimed in claim 19, further comprising means for controlling the source of motive power (12) so as to cause the body (2) to rotate about the first axis (4) at said rotational speed in excess of the predetermined value.

24. A motor (1) as claimed in claim 19, wherein the torque applying means (15) is arranged to apply the torque to the body (2) when the selected inclination angle (θ) is greater than 10 degrees and less than 80 degrees.

25. A motor (1) as claimed in claim 19, further comprising means for controlling the magnitude of the torque applied by the torque applying means (15).

26. A motor (1) as claimed in claim 19, wherein the limiting means (15) is arranged so as to limit rotation of the body (2) about the third axis (16) such that the inclination angle (θ) of the first axis (4) with respect to the second axis (11) is greater than 10 degrees and less than 80 degrees.

27. A motor (1) as claimed in claim 19, further comprising means for adjusting the inclination angle (θ).

28. A motor (1) as claimed in claim 27, further comprising means for selecting a desired output speed of the motor (1) and causing the adjusting means to adjust the inclination angle (θ) in dependence on the selected output speed.

29. A motor (1) as claimed in claim 27, further comprising means for selecting a desired output torque of the motor (1) and adjusting the inclination angle (θ) in dependence on the selected output torque.

30. A motor (1) as claimed in claim 19, wherein the means for applying a torque (15) comprises a spring.

31. A motor (1) as claimed in claim 19, wherein the means for applying a torque (15) comprises one or more of: a hydraulic ram; a pneumatic ram; and an electromagnetic ram.

32. A motor (1) as claimed in claim 19, wherein the limiting means (15) is arranged to prevent any rotation of the body (2) about the third axis (16) in a direction to decrease inclination angle ($\theta$).

33. A motor (1) as claimed in claim 19, wherein the means for applying a torque (15) serves additionally as the limiting means (15).

34. A motor as claimed in claim 19, wherein the limiting means (15) comprises an abutment.

35. A motor (1) as claimed in claim 19, wherein the first (4) and second (11) axes intersect.

36. A motor (1) as claimed in claim 19, wherein the first axis (4) passes through substantially the centre of mass of the body (2).

37. A motor (1) as claimed in claim 19, wherein the second axis (11) passes through substantially the centre of mass of the body (2).

38. A motor (1) as claimed in claim 19, wherein the first (4) and second (11) axes do not intersect and the inclination angle ($\theta$) is defined as the acute angle between the first (4) and second (11) axes when viewed along the direction of the shortest line joining the first (4) and second (11) axes.

39. A motor (1) as claimed in claim 19, wherein the body (2) is cylindrically symmetrical about the first axis (4).

40. A motor (1) as claimed in claim 39, wherein the body (2) comprises a cylinder the thickness of which is tapered from a maximum value proximal to the first axis to a minimum value at its circumference.

41. A motor (1) as claimed in claim 19, wherein the body (2) is made from a material having a high modulus of elasticity.

42. A motor (1) as claimed in claim 41, wherein the modulus of elasticity is above 100 GPa.

43. A motor (1) as claimed in claim 19, further comprising one or more counterbalance masses mounted for rotation about the second axis (11).

44. A vehicle powered by a motor (1) or assembly of motors as claimed in claim 19.

45. A vehicle as claimed in claim 44 in the form of a road vehicle.

46. A vehicle as claimed in claim 44 in the form of an aircraft.

47. A vehicle as claimed in claim 44 in the form of a water-borne vehicle.

48. An electricity generator comprising a motor (1) or assembly of motors as claimed in claim 19.

* * * * *